April 2, 1968        W. E. DONROE        3,376,055
COUPLING FOR BEADLESS-END PIPES
Filed April 19, 1966
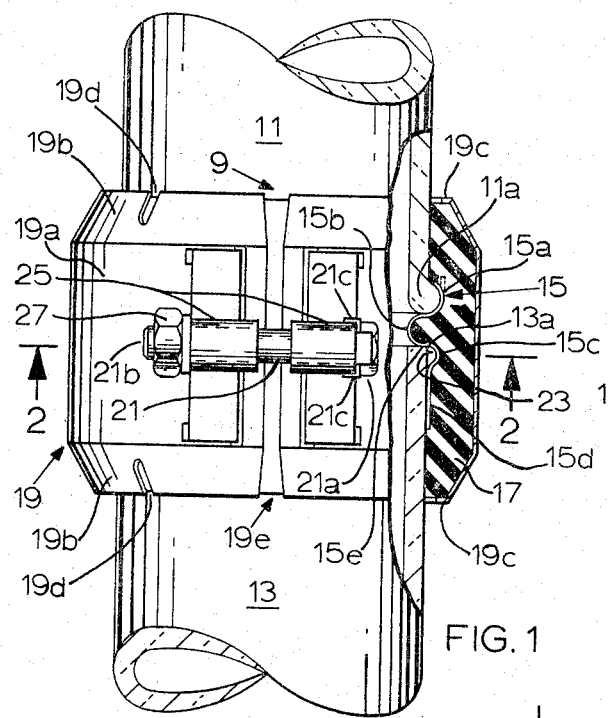
FIG. 1
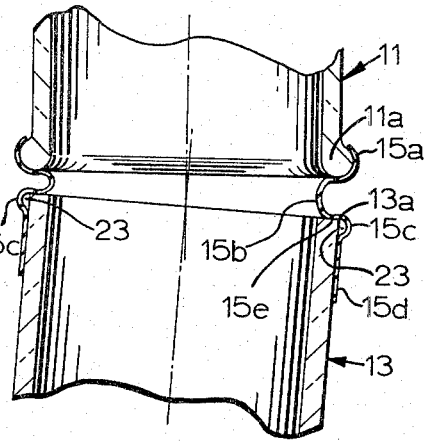
FIG. 3
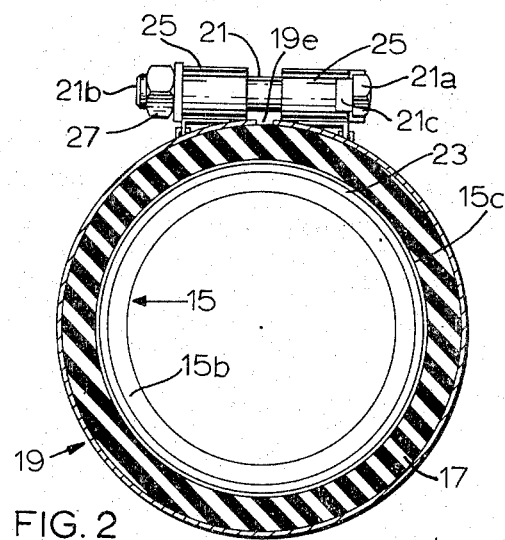
FIG. 2
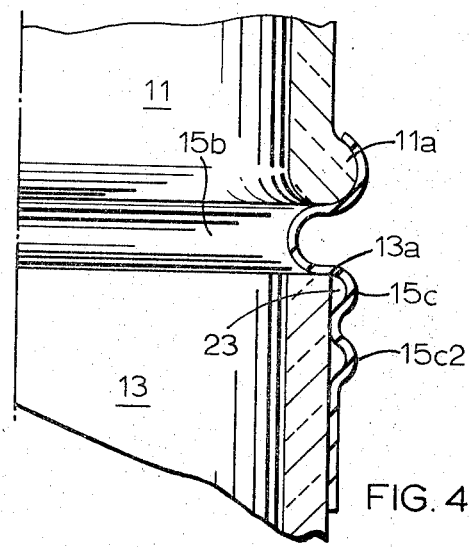
FIG. 4
FIG. 5
INVENTOR:
WILLIAM E. DONROE
BY Robert Henderson
attorney

United States Patent Office 3,376,055
Patented Apr. 2, 1968

3,376,055
COUPLING FOR BEADLESS-END PIPES
William E. Donroe, Penfield, N.Y., assignor to Garlock Inc., Palmyra, N.Y., a corporation of New York
Filed Apr. 19, 1966, Ser. No. 543,694
3 Claims. (Cl. 285—236)

ABSTRACT OF THE DISCLOSURE

A flexible, corrosive-resistant, tubular liner of a pipe coupling includes a flexible inner, circular corrugation extending between a flat, beadless end of one pipe and an adjacent end of another pipe, and a flexible outer corrugated portion includes an outer, circular corrugation which surrounds an outer, marginal end portion of said one pipe and adjoins said inner corrugation at a flat, annular portion of said liner extending radially outwardly beyond the outer edge of said flat end of said one pipe. A rubber sleeve surrounds the liner and a clamping collar surrounds the sleeve and clamps the latter and the liner firmly upon end portions of the two pipes.

Background of the invention

This invention relates to couplings for use in connecting or interconnecting pipes at least one of which has a beadless, relatively abrasive end.

While the invention is useful under other conditions, it is particularly useful and advantageous where the coupled pipes, in use, are subject to some vibration or misaligning movement and/or where they carry corrosive fluids, especially when such fluids are under pressure.

Glass pipes are commonly employed to carry corrosive fluids, and couplings to be used with such pipes are commonly lined with corrosive resistant material such as polytetrafluoroethylene, or i.e., "Teflon." References hereinafter to "Teflon" shall be taken to refer not only to polytetrafluoroethylene but also to include any other corrosion resistant material which functions substantially equivalently to "Teflon" in the concept hereinafter set forth.

One difficulty encountered in the use of such prior couplings has been that vibrations or misaligning relative movement of interconnected pipes causes a usually rather abrasive end of the beadless pipe to abrade and weaken or rupture the Teflon liner thereby subjecting surrounding portions of the coupling to the corrosive effects of the fluid carried in the pipes.

Another difficulty has been that, where the carried fluid is under pressure and particularly where the pipes are subject to some vibration or misaligning movements, the beadless pipe tends to cock infinitesimally within the liner or to creep or slip at least partly out of the coupling, either condition causing leakage of corrosive fluid, carried by the pipes, into corrosion inducing contact with parts of the coupling that are not very resistant to corrosion.

The principal object of this invention is the provision of a coupling which surmounts or minimizes the mentioned difficulties. This object is achieved according to the present invention by providing, in the coupling, a "Teflon" liner having a corrugated portion of which an inwardly extending corrugation serves as an abutment buffer between the ends of interconnected pipes and extends or merges, at a substantially flat radial wall, into a part of said corrugated portion which has one or more outwardly extending corrugations closely surrounding the outer end of the beadless pipe, thereby providing some axial flexibility in the liner in that area to oppose slippage of the beadless pipe and abrading of the "Teflon" liner.

Brief description of the drawing

In the accompanying drawing, three preferred embodiments of the invention are shown for illustrative purposes but without limitation of the invention thereto. In said drawing:

FIG. 1 is an elevational view of a coupling according to a preferred form of this invention, partly cut away to show a longitudinal section of the coupling.

FIG. 2 is a transverse sectional view substantially on the line 2—2 of FIG. 1.

FIG. 3 is a central, axial sectional view of the "Teflon" liner in the embodiment of FIG. 1, illustrating exaggeratedly the flexing of the liner which occurs in the presence of vibrations or misaligning relative movements of two interconnected pipes.

FIGS. 4 and 5 are half, central, longitudinal sectional views of "Teflon" liners according to two others of various possible modifications of the invention.

Detailed description of disclosed embodiments

In the embodiment of FIG. 1, coupling 9 interconnects the ends of beaded, glass pipe 11 and beadless glass pipe 13, the latter having a flat end surface with a rather sharp outer, circular edge 13a.

The coupling comprises a relatively thin Teflon sleeve or liner 15, intimately surrounded by a sleeve 17 of flexible rubber or equivalent material (all such rubber and material hereinafter being referred to for convenience merely as "rubber"), and the sleeve 17 is surrounded by a split, sheet metal clamping collar 19 which, by means of a headed bolt 21 is tightened to cause the collar to squeeze the sleeve 17 tightly upon the liner 15 and adjacent cylindrical surfaces of the two pipes.

The liner 15 is of relatively thin "Teflon" so that it may flex as hereinafter explained. Its shape, as viewed in axial section both before assembly of the parts of the coupling and after such assembly is approximately as shown in FIG. 1, except that its upper lip 15a, before such assembly is cylindrical as shown in broken lines. Upon such assembly, the lip 15a is rolled in to some extent about bead 11a of the beaded pipe by the rubber sleeve 17. Said lip is rolled tightly about said bead to its full line position by clamping of the coupling upon the pipes as hereinafter explained.

The liner 15 is formed with an inner corrugation 15b which extends between the opposed ends of the two pipes. This corrugation, at one side, integrally adjoins the lip 15a and, at its other side, integrally adjoins an outer corrugation 15c of the liner, the latter juncture forming a narrow, radially extending, annular portion 15e of the liner which is substantially flat.

The outer corrugation 15c overlies a cylindrical end portion of the pipe 13 and, at that point, defines therewithin an annular space 23 which, when the connected pipes are in alignment as in FIG. 1, is of uniform dimensions there around. The outer corrugation 15c integrally adjoins a cylindrical end portion 15d of the liner, this portion intimately overlying a cylindrical portion of the pipe 13 adjacent to the space 23 and being made to an inside diameter approximately the same as or only slightly larger than the outside diameter of the underlying pipe.

The sleeve 17 is generally cylindrical. Initially, its outer surface is approximately cylindrical, and its inner surface is cylindrical except in being formed so that, intermediate the ends of the sleeve, it is shaped complementally to the outer surface of the liner 15. Upon application of the collar 19 and installation of the coupling, the ends of the rubber sleeve are deformed inwardly by the collar 19 as hereinafter explained.

The clamping collar 19 is formed with an intermediate, cylindrical portion 19a in radial alignment with the liner 15 and extending axially beyond the latter's ends. Integral with opposite ends of the cylindrical portion 19a are approximately similar, inwardly tapering, frusto-conical end portions 19b formed with integral inwardly extending radial flanges 19c which terminate at such distance from the pipes as to allow some malalignment of the latter without interference therewith.

The spacing of the flanges 19c from the pipes, however, is close enough to prevent material flow of the rubber of the sleeve 17 from the ends of the collar 19 when the coupling is firmly clamped in place. As a practical matter, the metal of collar 19, originally entirely cylindrical, has plural, cut outs 19d opening at opposite ends of the collar to facilitate the forming of the inwardly extending parts 19b and 19c of the collar.

The collar 19, at opposite sides of its split 19e, is provided with integral, approximately coaxial bolt receiving sleeves 25 through which the bolt 21 extends with its head 21a abutting the outer end of one of the sleeves 25 and the opposite, threaded end 21b of the bolt projecting from the outer end of the other of the sleeves 25. A nut 27 is threaded on the end 21b of the bolt to contract and thereby tighten the split collar 19 over underlying parts of the coupling. The head 21a of the bolt may advantageously be formed with integral tongues 21c overlying opposite sides of related sleeve 25 to hold the bolt against turning when the nut 27 is tightened.

The rubber sleeve, initially, has a generally cylindrical outer surface as already stated. Also, it is initially slightly shorter than after the parts of the coupling have been assembled. Said sleeve is deformed to some extent from its external cylindrical shape toward an external, end-tapered shape shown in FIG. 1, by reason of its confinement within the collar 19.

Prior to installation, the collar 19 is quite loose and the inside diameter of the end portions of the rubber sleeve 17 is preferably the same or only slightly greater than the outside diameters of the cylindrical portions of the two pipes.

Installation of the coupling is accomplished by sliding the two pipe ends into opposite ends of the coupling to their positions shown in FIG. 1 wherein the bead 11a of pipe 11 abuts one side of the corrugation 15b and the flat end of pipe 13 abuts the opposite side of said corrugation. Although the outside diameter of the bead 11a is somewhat greater than the inside diameter of the adjacent end of the rubber sleeve 17, the mentioned sliding of the pipe 11 into place is not materially opposed as the surrounding rubber of the sleeve 17 expands within the then loose collar 19 as the bead 11a moves into place. Of course, there is nothing to oppose sliding of pipe 13 into the coupling.

After the two pipes have thus been slid into place, the nut 27 is tightened thereby causing the collar 19 very forcibly to clamp the within parts of the coupling upon the two pipes, leaving the pipes and coupling substantially as shown in FIG. 1. The mentioned tightening completes the deformation of the end portions of the rubber sleeve 17 to their tapered shape as shown so that said end portions tightly grip the two pipes and that the lip 15a of the "Teflon" liner is completely rolled inwardly upon the bead 11a as indicated in full lines in FIG. 1.

The chief difference between the coupling of this invention and prior couplings designed for a similar purpose is the provision of the outer corrugation 15c defining thereunder the annular space 23 as compared to prior couplings wherein a cylindrical end portion comparable to portion 15d extends uninterruptedly in cylindrical form from the near end of the "Teflon" liner to the near end of an inwardly extending corrugation comparable to corrugation 15b.

Experience with couplings differing as indicated in the next preceding paragraph shows that under vibratory or misaligning relative movements of the interconnected pipes, the "Teflon" liners of prior couplings permit leakage of corrosive fluid within the pipes to the rubber sleeve which has little or no corrosion resistance while, with couplings according to this invention, such leakage does not occur.

It appears that the improved results realized from the use of couplings according to this invention arise at least partly from the fact that, where the liner's corrugations 15b and 15c adjoin, they provide the approximately flat section 15e against an inner surface of which the flat end surface of the pipes 13 abuts. Thus, if vibrations, ordinarily slight, take place in the coupling during use, the sharp outer edge 13a of pipe 13 has little or no tendency to cut into the liner.

It appears, also, that the provision of the outer corrugation 15c not only gives rise to the formation of the flat section 15e, as just noted, but it also affords a useful measure of axial flexibility in the part of the "Teflon" liner which surrounds pipe 13. This flexibility appears important when consideration is given to three characteristics of "Teflon"; (1) its slipperiness, (2) its ability to flex in relatively thin sections thereof, and (3) its resistance against flexing under other conditions.

Except under substantial restraint, the slipperiness of the "Teflon" may permit some sliding of the pipe 13 within the liner 15. The ability of "Teflon" to flex is understandable from the different shapes of the inner corrugation 15b at circumferentially opposite points thereof as illustrated in FIG. 3. Referring again to FIG. 3, if the outer corrugation 15c were not provided, the indicated misaligning tends effectively to cause infinitesimal cocking and diametral flexing of the cylindrical end portion of the liner relatively to the pipe 13, thereby increasing the force of engagement of said portion 15d with the left side of pipe 13 as viewed in that figure and decreasing the force of engagement of the portion 15d with the right side of said pipe. This permits leakage to the rubber sleeve 17 which possesses little or no resistance to corrosion.

The provision of the outer corrugation 15c according to this invention, provides axial flexibility in the liner 15 between the lower end of inner corrugation 15b and the lower end of the liner. Thus, in the presence of misalignment between the pipes, the tendency of the cylindrical portion 15d of the liner to engage the pipe 13 with decreasing force at one side thereof is greatly reduced or eliminated because of the capability of outer corrugation 15c to flex axially sufficiently to relieve the part 15d of any material cocking tendency.

The provision of an additional outer corrugation 15c2 in the modified form of liner shown in FIG. 4, affords an increased capability of axial flexing such as mentioned in the next preceding paragraph, and may further decrease the mentioned cocking tendency.

FIG. 5 shows a modification of this invention as applied to the interconnecting of two beadless end pipes 11x and 13. In this modification, the opposite end halves of "Teflon" liner 15x are identical as shown in the drawing.

Although the invention has been illustrated as applied to two pipes of equal outside diameters, it should be clear, to those familiar with this art, that a coupling having the same novel characteristics may be provided for use in interconnecting pipes of somewhat different outside diameters.

It should be understood that the structures illustrated in FIGS. 3, 4, and 5 are only parts of a complete coupling. In all cases, a complete coupling includes a suitable rubber sleeve such as sleeve 17 and a suitable clamping collar such as collar 19.

Those familiar with this art will readily perceive that the sectional shapes of some or all of the corrugations may be changed and that the coupling may be modified in other respects without, however, departing from the invention as set forth in the following claims.

I claim:
1. A coupling for connecting a first cylindrical pipe end portion having a constant outer diameter and a flat end surface to an end portion of another pipe, said coupling comprising a tubular liner of flexible, corrosive-resistant material, adapted to sealingly engage the ends and adjacent outer surfaces of said end portions, a rubber sleeve intimately surrounding said liner and extending beyond opposite ends thereof, and a clamping collar intimately surrounding said rubber sleeve and being tightenable upon the latter to press the sleeve firmly upon the two pipes and upon said liner to hold the latter in sealing engagement with the two pipes; said liner including a flexible inner corrugation adapted to extend between and in abutting relation to the ends of both said end portions, an axially flexible outer corrugated portion one end of which integrally adjoins said inner corugation, said outer corrugated portion overlying an outer cylindrical surface of said first end portion adjacent to the latter's end and defining, with said surface, an annular space extending about said first end portion, and a cylindrical portion of said liner, integrally adjoining the other end of said outer corrugated portion and adapted to sealingly engage an underlying surface of said first end portion; and the juncture of said inner corrugation with said outer corrugated portion being a substantially flat radial wall of the liner which is in flat face-to-face engagement with said flat end surface of said first pipe end portion and extends radially outwardly beyond the outer edge of said flat end surface.

2. A coupling according to claim 1, said other pipe also including a cylindrical pipe end portion having a constant outer diameter, and the coupling further comprising a second axially flexible outer corrugated portion one end of which integrally adjoins said inner corrugation, said second outer corrugated portion overlying an outer cylindrical surface of said other pipe adjacent to the latter's end and defining, with the latter surface, an annular space extending about said other pipe, and a second cylindrical end portion integrally adjoining the other end of said second corrugated portion and adapted to sealingly engage an underlying surface of said other pipe; and the juncture of said inner corrugation with said second outer corrugated portion being a substantially flat radial wall of the liner which extends radially outwardly beyond the outer edge of the end surface of said other pipe end portion.

3. A coupling according to claim 1, said other pipe having an end bead of arcuate shape in section, and said liner including a sectionally arcuate portion, in intimate, arcuate engagement about said bead.

References Cited

UNITED STATES PATENTS

| | | | |
|---|---|---|---|
| 1,062,155 | 5/1913 | Harris | 285—253 X |
| 1,829,236 | 10/1931 | Perkins | 285—236 X |
| 3,232,647 | 2/1966 | Kirchoff. | |
| 3,233,907 | 2/1966 | Stanton. | |

FOREIGN PATENTS 834,853    5/1960    Great Britain.

EDWARD C. ALLEN, *Primary Examiner.*

THOMAS F. CALLAGHAN, *Examiner.*